US008484734B1

(12) United States Patent
Tsai et al.

(10) Patent No.: US 8,484,734 B1
(45) Date of Patent: Jul. 9, 2013

(54) APPLICATION PROGRAMMING INTERFACE FOR ANTIVIRUS APPLICATIONS

(75) Inventors: Ching Sung Tsai, Taipei (TW); Hui Min Wang, Taipei (TW); Chi Huang Fan, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 2096 days.

(21) Appl. No.: 11/507,732

(22) Filed: Aug. 22, 2006

(51) Int. Cl.
*G06F 21/00* (2006.01)

(52) U.S. Cl.
USPC .......................................................... 726/24

(58) Field of Classification Search
USPC ..................................... 713/164, 188; 726/24
See application file for complete search history.

(56) References Cited

U.S. PATENT DOCUMENTS

| | | | | |
|---|---|---|---|---|
| 6,658,571 B1 * | 12/2003 | O'Brien et al. | ................. | 726/26 |
| 6,728,907 B1 * | 4/2004 | Wang et al. | ..................... | 714/47 |
| 6,735,774 B1 * | 5/2004 | Krishnaswamy | ............. | 719/328 |
| 7,099,866 B1 * | 8/2006 | Crosbie et al. | .................... | 707/9 |
| 7,149,832 B2 * | 12/2006 | Wieland et al. | ............... | 710/269 |
| 2005/0149726 A1 * | 7/2005 | Joshi et al. | ..................... | 713/164 |
| 2007/0150956 A1 * | 6/2007 | Sharma et al. | .................. | 726/24 |
| 2007/0283192 A1 * | 12/2007 | Shevchenko | .................... | 714/39 |

OTHER PUBLICATIONS

Application programming interface (API) from Wikipedia, the free encyclopedia; Jul. 2006, pp. 1-3 [retrieved on Aug. 14, 2006]. Retrieved from the internet: http://en.wikipedia.org/wiki/Application_programming_interface.
NtDeviceloControlFile Function, 2006 Microsoft Corporation, pp. 1-3 (retrieved on Aug. 15, 2006]. Retrieved from the internet: http://msdn.microsoft.com/library/en-us/winui/winui/windowsuserinterface/lowlevelclientsupport/misc/ntdeviceiocontrolfile,asp.
DeviceIoControl, 2006 Microsoft Corporation, pp. 1-4 (retrieved on Aug. 15, 2006]. Retrieved from the internet: http://msdn.microsoft.com/library/en-us/devio/base/deviceiocontrol.asp?frame=true.
NtCreateFile, 2006 Microsoft Corporation, pp. 1-8 (retrieved on Aug. 14, 2006]. Retrieved from the internet: http://msdn.microsoft.com/library/defaultasp?url=/library/en-us/devnotes/winprog/ntcreatefile.asp.
James Butler and Sherri Sparks "Windows rootkits of 2005, part one" Nov. 4, 2005, pp. 1-9 (retrieved on Aug. 14, 2006]. Retrieved from the internet: http://www.securityfocus.com/infocus/1850.
James Butler and Sherri Sparks "Windows rootkits of 2005, part two" Nov. 17, 2005, pp. 1-1 (retrieved on Aug. 14, 2006]. Retrieved from the internet: http://www.securityfocus.com/infocus/1851.
James Butler and Sherri Sparks "Windows rootkits of 2005, part three" Jan. 5, 2006, pp. 1-10 retrieved on Aug. 14, 2006]. Retrieved from the internet: http://www.securityfocus.com/infocus/1854.

* cited by examiner

*Primary Examiner* — Shaun Gregory
(74) *Attorney, Agent, or Firm* — Okamoto & Benedicto LLP

(57) ABSTRACT

In one embodiment, an antivirus uses a secure call path that includes an antivirus system call table containing a reference to an operating system kernel routine. The call path may also include an antivirus device driver that has access to the antivirus system call table. The antivirus may send a service request to the operating system kernel routine by way of the call path to perform file manipulations for virus scanning, for example. Advantageously, the call path gets around possible rootkit infestations.

16 Claims, 5 Drawing Sheets

APPLICATION PROGRAMMING INTERFACE FOR ANTIVIRUS APPLICATIONS

BACKGROUND OF THE INVENTION

1. Field of the Invention

The present invention relates generally to data processing, and more particularly but not exclusively to application programming interfaces.

2. Description of the Background Art

Generally speaking, a computer operating system is a program that manages computer resources and other programs, which are referred to as "application programs." A kernel is the core of the operating system and provides basic services for all other components of the operating system and application programs. Application programs and the kernel employ different and distinct regions of computer memory. Application programs are user-level programs and accordingly run in user mode in user mode space of the memory. On the other hand, the kernel runs in kernel mode in kernel mode space of the memory, which is generally restricted to kernel operations. Kernel mode is a privileged mode of processor execution in that it typically grants access to all system memory and all the processor's instructions.

Operating systems typically provide an interface that allows an application program in user mode to invoke kernel routines that perform low-level operations typically reserved for the kernel. Examples of these kernel routines include those for file manipulations, such as creating, reading, or modifying files. An antivirus employs kernel routines to detect and remove computer viruses. For example, an antivirus may request the service of a kernel routine to open a file in order to scan that file for computer viruses.

FIG. 1 shows a flow diagram schematically illustrating how an antivirus 10 may request the service of a kernel routine 13 by way of an OS kernel routine interface 11. The OS kernel routine interface 11, the OS kernel routines 13, and other components preceded by "OS" or "operating system" come standard with the operating system, and accordingly are from the vendor of the operating system. In the example of FIG. 1, the antivirus 10 in user mode invokes the operating system (OS) kernel routine interface 11, which may be part of the OS application programming interface (API). In response, the kernel routine interface 11 invokes the kernel routine 13 of interest in kernel mode, which performs the operation requested by the antivirus 10.

A rootkit comprises computer-readable program code designed to conceal running processes, files, or system data. Rootkits may be used to surreptitiously modify parts of the operating system or install themselves as drivers or kernel modules. Increasingly, rootkits are being used by virus coders as malicious code or part of malicious code. FIG. 2 shows a flow diagram schematically illustrating how a rootkit may intercept service requests to kernel routines. The example of FIG. 2 is the same as that of FIG. 1 except that a rootkit 12 intercepts calls to the OS kernel routines 13. The rootkit 12 compromises the call path from the antivirus 10 to the OS kernel routines 13. For example, the rootkit 12 may not perform the requested call to the OS kernel routines 13, thereby rendering the antivirus 10 ineffective.

SUMMARY

In one embodiment, an antivirus uses a secure call path that includes an antivirus system call table containing a reference to an operating system kernel routine. The call path may also include an antivirus device driver that has access to the antivirus system call table. The antivirus may send a service request to the operating system kernel routine by way of the call path to perform file manipulations for virus scanning, for example. Advantageously, the call path gets around possible rootkit infestations.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Computer viruses, worms, Trojans, rootkits, and spyware are examples of malicious codes that have plagued computer systems throughout the world. Although there are technical differences between each type of malicious code, malicious codes are collectively referred to herein as "viruses."

Figure 3:
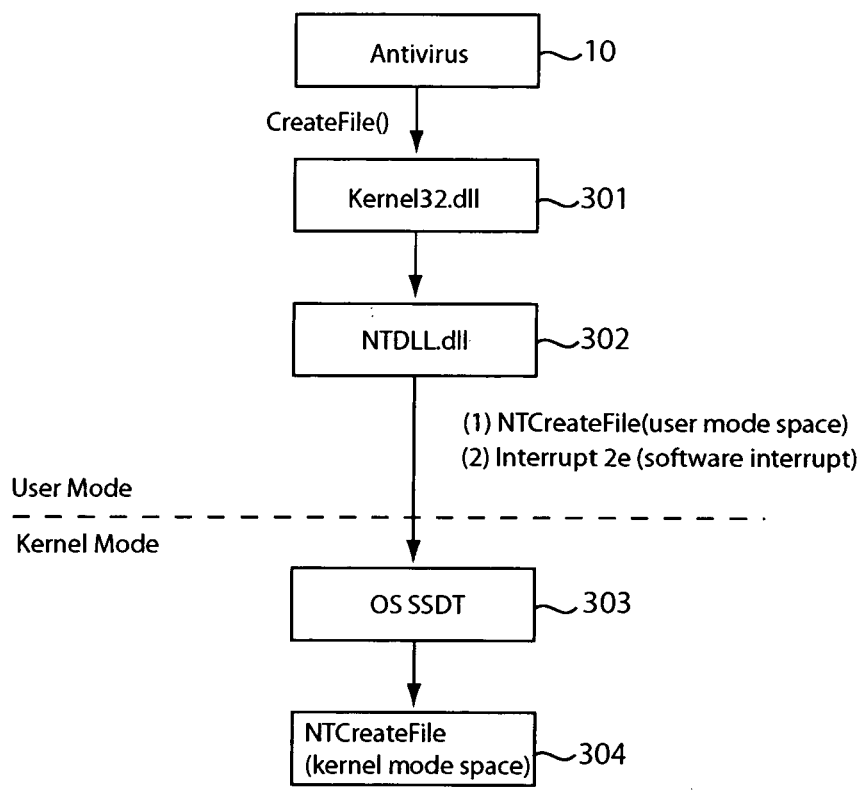
FIG. 3 shows a flow diagram schematically illustrating a call path from a conventional antivirus program to an OS kernel routine.

FIG. 3 shows a flow diagram schematically illustrating a call path from a conventional antivirus program to an OS kernel routine. As used in the present disclosure, the term "routine" refers to functions, procedures, subroutines and other computer-readable program code that may be invoked by other programs. In the example of FIG. 3, the antivirus 10 operates under the Microsoft Windows™ operating system Win32 subsystem and requests the services of an OS kernel routine for file manipulation, which is NTCreateFile in the example (see 304). The antivirus 10 initiates the service request by invoking the function CreateFile of Kernel32.dll (see 301). This results in the Kernel32.dll calling into the NTDLL.dll (see 302) to invoke the NTCreateFile (referenced by its system service number) in user mode and then assert software interrupt 2e to trap to kernel mode.

The OS System Service Descriptor Table (SSDT) 303, also known as an "OS system call table," is a kernel table that contains the addresses of OS kernel routines in the Microsoft Windows™ operating system. In the example of FIG. 3, the service request by the antivirus 10 eventually reaches the OS SSDT (see 303), which points to NTCreateFile in kernel mode space (see 304). The NTCreateFile executes and services the request by the antivirus 10. A rootkit can maliciously modify the call path from the antivirus 10 in user mode to the NTCreateFile in kernel mode, compromising the effectiveness of the antivirus 10.

Figure 4:
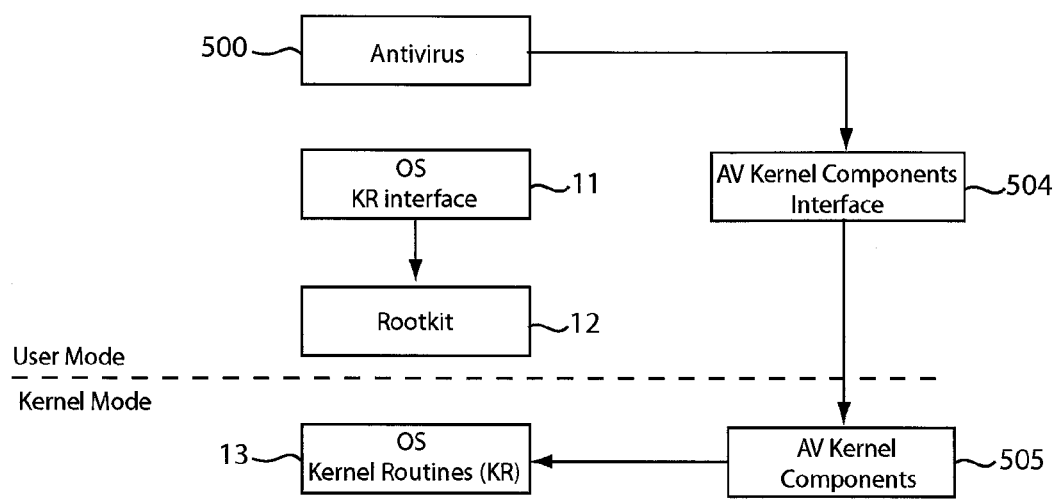
FIG. 4 shows a flow diagram schematically illustrating how an antivirus may send a service request to an OS kernel routine, in accordance with an embodiment of the present invention.

FIG. 4 shows a flow diagram schematically illustrating how an antivirus 500 may send a service request to an OS kernel routine, in accordance with an embodiment of the present invention. In the example of FIG. 4, the antivirus 500 bypasses the OS kernel routine interface 11 to send a service request to an OS kernel routine 13. To advantageously get around rootkit infestations, the antivirus 500 uses a call path that includes an antivirus (AV) kernel components interface 504 in user mode and an AV kernel components 505 in kernel mode. In operation, the antivirus 500 sends a service request by making a call to the AV kernel components interface, which forwards the service request to the OS kernel routine 13 of interest by way of the AV kernel components 505. This allows the antivirus 500 to have a secure call path to OS kernel routines 13. The secure call path does not include the OS kernel routines interface 11, which is what the vendor of the operating system originally provides for interfacing with OS kernel routines 13. By not using the OS kernel routines interface 11, the antivirus 500 may still operate correctly even if the rootkit 12 intercepts calls from the OS kernel routines interface 11 or even if the OS system service descriptor table has been corrupted or modified by the rootkit 12.

Figure 5:
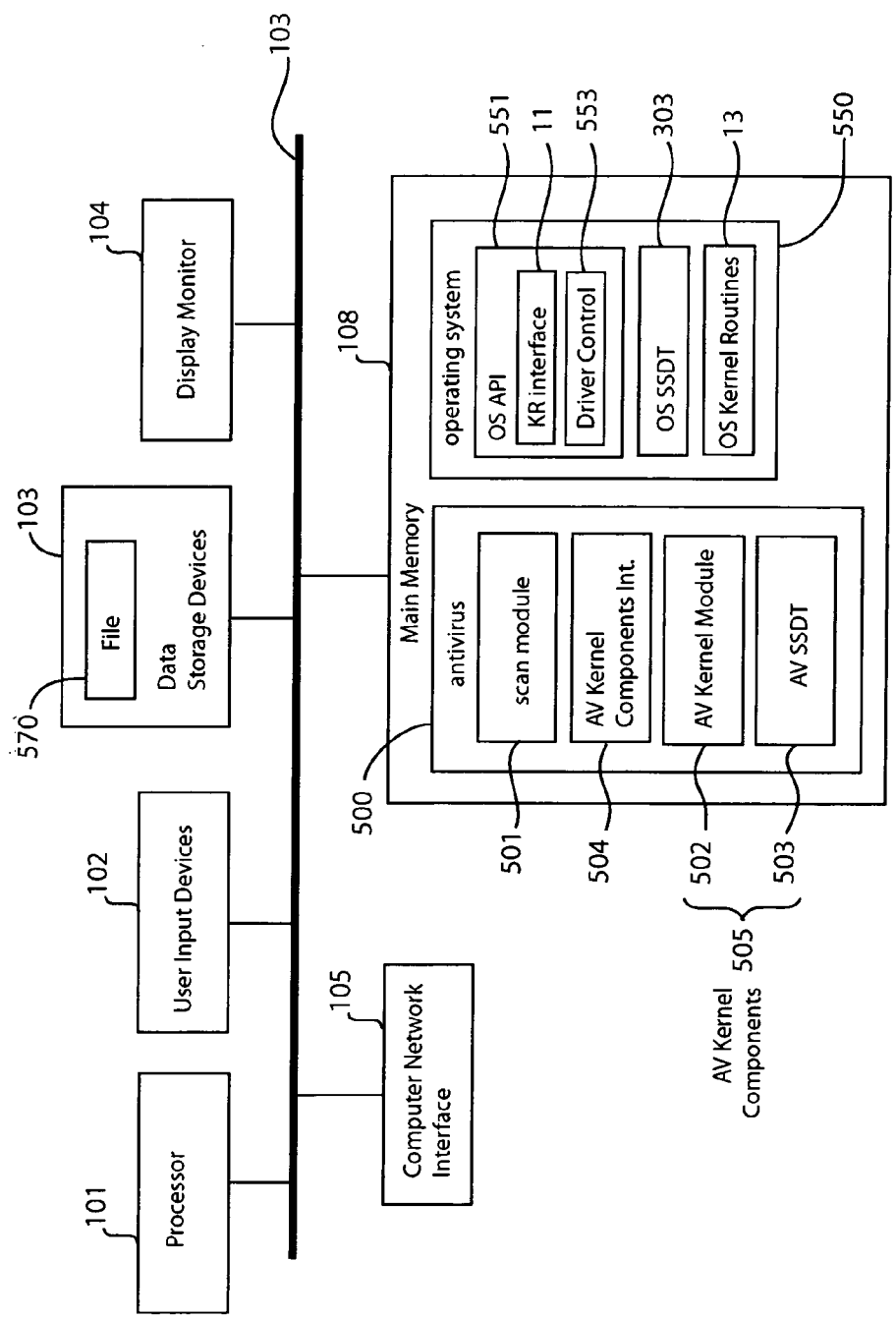
FIG. 5 shows a schematic diagram of a computer in accordance with an embodiment of the present invention.

Referring now to FIG. 5, there is shown a schematic diagram of a computer in accordance with an embodiment of the present invention. The computer shown in the example of FIG. 5 may be employed as a client computer or a server computer, for example. The computer of FIG. 5 may have less or more components to meet the needs of a particular application. As shown in FIG. 5, the computer may include a processor 101, such as those from the Intel Corporation or Advanced Micro Devices, for example. The computer may have one or more buses 103 coupling its various components. The computer may include one or more user input devices 102 (e.g., keyboard, mouse), one or more data storage devices 103 (e.g., hard drive, optical disk, USB memory), a display monitor 104 (e.g., LCD, flat panel monitor, CRT), a computer network interface 105 (e.g., network adapter, modem), and a main memory 108 (e.g., RAM). In the example of FIG. 5, the main memory 108 includes software (i.e., computer-readable program code) components of an operating system 550 and the antivirus 500. Components of the operating system 550 and the antivirus 500 may be executed by the processor 101.

Figure 1:
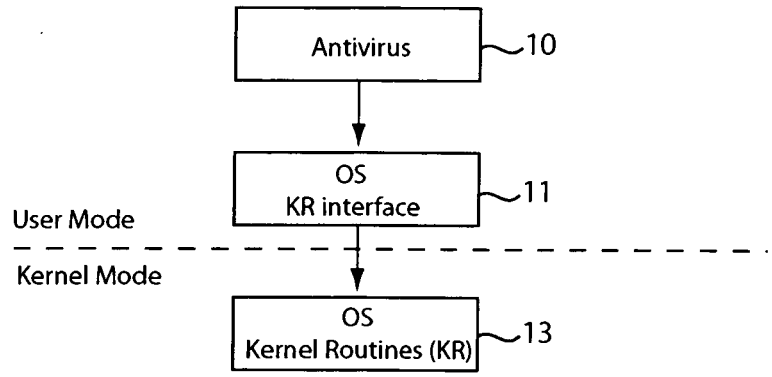
FIG. 1 shows a flow diagram schematically illustrating how an antivirus may request the service of a kernel routine by way of an OS kernel routine interface.
Figure 2:
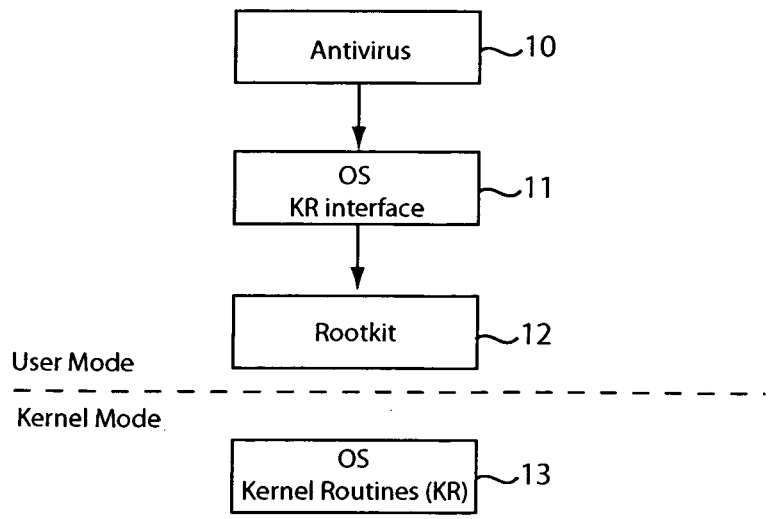
FIG. 2 shows a flow diagram schematically illustrating how a rootkit may intercept service requests to kernel routines.

In one embodiment, the operating system 550 comprises the Microsoft Windows™ operating system (e.g., Windows XP™, Windows 2000™, and Windows 2003™ operating systems). The operating system 550 includes an OS application programming interface (API) 551 for allowing application programs executing in user mode to send service requests to programs executing in kernel mode. The OS API 551 includes an OS kernel routines interface 11 and a driver control 553. The OS kernel routines interface 11 are APIs specifically designed by the vendor of the operating system 550 to allow application programs to send service requests to OS kernel routines 13. That is, the conventional call path between an application program and an OS kernel routine 13 is through the OS kernel routines interface 11. Conventional application programs are thus configured to send service requests to OS kernel routines 13 by calling into the OS kernel routines interface 11 (see also FIG. 1).

The driver control 553 is an API that allows application programs in user mode to communicate with device drivers executing in kernel mode. A device driver comprises computer-readable program code for controlling a hardware device. In the Microsoft Windows™ operating system, an application may use a driver control 553 to send control codes to a device driver. An example driver control 553 in the Microsoft Windows™ operating system is the NtDeviceloControlFile function. As will be more apparent below, the antivirus 500 may send a service request to an OS kernel routine 13 by way of a call path through a driver control 553 and an antivirus system call table (i.e., AV SSDT 503), instead of the conventional call path through an OS kernel routines interface 11 and OS SSDT 303.

The antivirus 500 may comprise computer-readable program code for detecting malicious code. The antivirus 500 may include a scan module 501, an AV kernel components interface 504, and AV kernel components 505 (see also FIG. 4). The AV kernel components 505 may comprise an AV kernel module 502 and an antivirus System Service Descriptor Table (AV SSDT) 503.

The scan module 501 may comprise computer-readable program code for scanning data for computer viruses. The antivirus 500 may scan the file 570 stored in a data storage device 103, for example. The scan module 501 may employ a suitable conventional algorithm for scanning data without detracting from the merits of the present invention. The mechanics of scanning data for viruses, in general, is well known and employed by antivirus products from a variety of vendors including Trend Micro, Inc., for example.

The AV kernel components interface 504 may comprise computer-readable program code configured to allow components of the antivirus 500 operating in user mode to communicate with components of the antivirus 500 operating in kernel mode. More specifically, in one embodiment, the AV kernel components interface 504 works in conjunction with the AV kernel components 505 to allow the scan module 501 to send service requests to an OS kernel routine 13. In one embodiment, the AV kernel components interface 504 comprises a library for the Win32 subsystem of the Microsoft Windows™ operating system. The library may comprise functions that use the Kernel32.dll to call into NTDLL.dll to send driver control codes to the AV kernel module 502, which is configured as a device driver. Because the AV kernel components interface 504 is not part of the standard Microsoft Windows™ operating system, the AV kernel components interface 504 is accessible only to the antivirus 500 and related components. This advantageously prevents rootkits and other programs from interfering with the operation of the antivirus 500.

As shown in FIG. 5, the AV kernel components 505 may comprise the AV kernel module 502 and the AV SSDT 503. The AV kernel module 502 may comprise a device driver operating in kernel mode. Unlike a conventional device driver, the AV kernel module 502 is configured to access the AV SSDT 503 to initiate execution of the OS kernel routine 13 as per a service request by the scan module 501. In one embodiment, the AV kernel module 502 is registered as device driver in Microsoft Windows™ operating system by the Service Control Manager (SCM). This allows the AV kernel module 502 to operate in kernel mode, allowing it to access kernel data and information. The AV kernel module 502 may be configured to allocate kernel memory space for the AV SSDT 503 and build the AV SSDT 503 in that kernel memory space.

The AV SSDT 503 may comprise a system call table containing a listing of pointers to addresses of OS kernel routines 13. The AV SSDT 503 may thus be used to initiate execution of an OS kernel routine 13. As shown in FIG. 5, the AV SSDT 503 is separate from the OS SSDT 303, which application programs generally use to gain access to services of OS kernel routines 13. In one embodiment, unlike the OS SSDT 303, the AV SSDT 503 is used exclusively by the antivirus 500 and related components that have access to the AV kernel components interface 504. That is, in one embodiment, the AV SSDT 503 is not accessible to other application programs. This advantageously prevents rootkits from modifying or corrupting the AV SSDT 503.

In one embodiment, the AV SSDT 503 may be built in kernel memory space as follows:

Step 1. The AV kernel module 502 queries the current module list and gets the address of the win32 kernel module file (ntoskrnl.exe).

Step 2. The AV kernel module 502 opens the win32 kernel module file and reads its contents into kernel memory space.

Step 3. The AV kernel module 502 translates the physical file contents of the win32 kernel module file in memory into run-time system process memory layout to find the pointer to the OS SSDT image. Note that this OS SSDT image is from the win32 kernel module file that was opened by the AV kernel module 502, and is the AV SSDT 503 in this example. Building the AV SSDT 503 from the win32kernel module file minimizes the chance of rootkit-infected SSDT.

Step 4. The AV kernel components interface 504 retrieves the pointer to the AV SSDT 503 in kernel memory space by exporting information from the AV kernel module 502.

Step 5. The AV kernel components interface 504 verifies the image exporting information is correct by its exporting API name.

Step 6. The AV kernel components interface 504 gets the pointers to the OS kernel routines 13 in the AV SSDT 503. Subtracting the base address of the AV SSDT 503 from the pointers gives the offset to each of the pointers.

Step 7. An OS kernel routine 13 may be accessed by its offset plus the base address of the current win32 kernel module.

Figure 6:
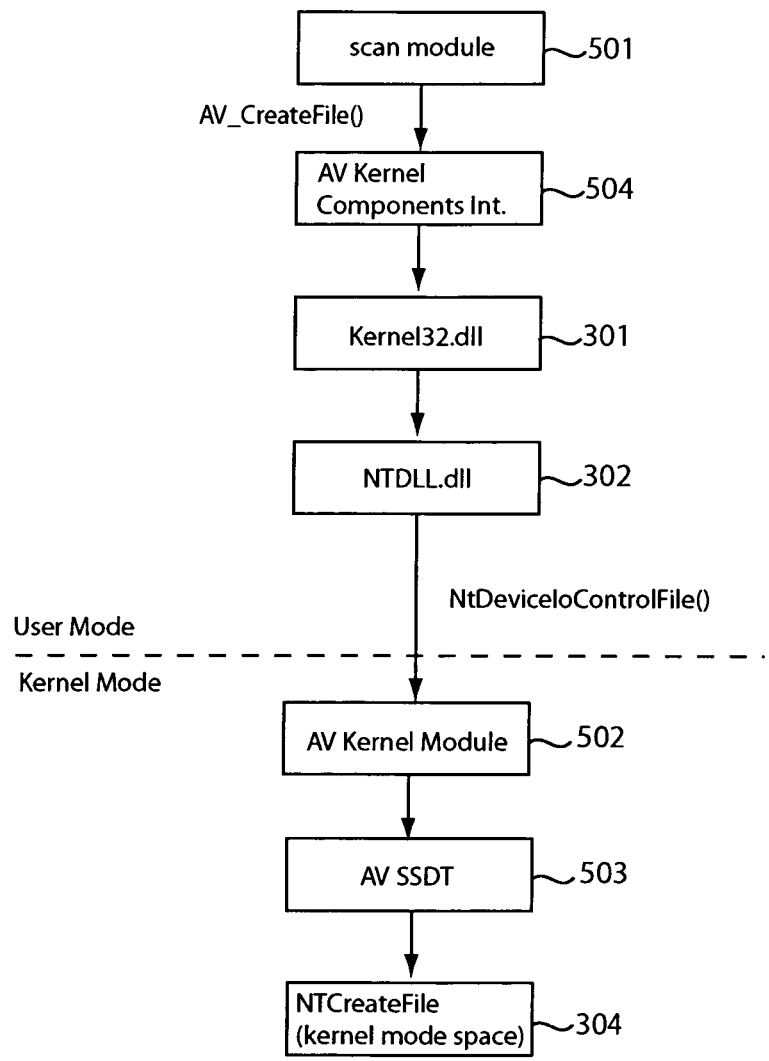
FIG. 6 shows a flow diagram schematically illustrating a call path from an antivirus operating in user mode to an OS kernel routine in kernel mode in accordance with an embodiment of the present invention.

FIG. 6 shows a flow diagram schematically illustrating a call path from an antivirus operating in user mode to an OS kernel routine in kernel mode in accordance with an embodiment of the present invention. The example of FIG. 6 is explained using the Microsoft Windows™ operating system and the components shown in FIG. 5 as an example, not limitation.

In the example of FIG. 6, the scan module 501 opens the file 570 (see FIG. 5) for virus scanning by calling a function for opening files. This function for opening files may be provided as a library service by the AV kernel components interface 504. The function for opening the file 570 is AV_CreateFile in this example. In response to the function call by the scan module 501, the AV kernel components interface 504 sends control codes and parameters to the AV kernel module 502. The control codes may include the pointer to the corresponding OS kernel routine 13 corresponding to AV_CreateFile, which is NtCreateFile in this example. The parameters may be those accepted by NtCreateFile for opening a file (e.g., name of the file 570). In one embodiment, the AV kernel components interface 504 sends the control codes and parameters to the AV kernel module 502 by calling into the kernel32dll.dll (see 301), which invokes the NTDLL.dll (see 302) to pass the control code and parameters to the AV kernel module 502 executing in kernel mode as a device driver. In one embodiment, the NTDLL.dll does so using the NtDeviceIoControlFile function, which is typically employed to communicate with device drivers in the Microsoft Windows™ operating system. The AV kernel module 502 receives the control codes and parameters, and uses the control codes to find the pointer to the NtCreateFile in the AV SSDT 503. From the AV SSDT 503, the NtCreateFile executes to service the request by the scan module 501 to open the file 570. Thereafter, the scan module 501 scans the now opened file 570 for computer viruses.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method to be performed by a computer running an operating system, the method comprising:

building an antivirus system call table containing a reference to an operating system kernel routine, the antivirus system call table being built separately from an operating system call table originally configured by a vendor of the operating system to also have a reference to the operating system kernel routine to allow application programs to send service requests to the operating system kernel routine;

sending a service request to open a file from an antivirus in user mode to the operating system kernel routine in kernel mode, the service request being sent to the operating system kernel routine by way of a call path that does not include the operating system call table;

in response to the service request to open the file, initiating invocation of the operating system kernel routine from the antivirus system call table; and scanning the file for computer viruses after the operating system kernel routine services the service request to open the file.

2. The method of claim 1 wherein the service request to open the file goes through a call path that includes an antivirus device driver in kernel mode and the antivirus system call table.

3. The method of claim 2 wherein the antivirus device driver builds the antivirus system call table in kernel mode space.

4. The method of claim 1 wherein the operating system comprises the Windows operating system.

5. The method of claim 1 wherein the operating system call table comprises a system service descriptor table (SSDT).

6. The method of claim 1 wherein the operating system call table has been corrupted by a rootkit.

7. The method of claim 1 wherein the antivirus system call table is available exclusively to the antivirus and its components.

8. The method of claim 1 wherein the antivirus system call table is built from a kernel module file.

9. A computer comprising:

a scan module configured to scan data for computer viruses;

an antivirus system call table containing a pointer to an operating system kernel routine, the antivirus system call table being separate from an operating system call table that application programs generally use to gain access to service of the operating system kernel routine; and an antivirus device driver configured to allow the scan module to gain access to service of the operating system kernel routine by way of the antivirus system call table using a call path that does not include operating system call table, the antivirus device driver being configured to run in kernel mode as a device driver.

10. The computer of claim 9 further comprising an antivirus kernel components interface in user mode, the antivirus kernel components interface being configured to allow the scan module to interface with the antivirus device driver.

11. The computer of claim 9 wherein the operating system call table comprises a system service descriptor table (SSDT).

12. The computer of claim 9 wherein the operating system call table has been corrupted by a rootkit.

13. A method to be performed by a computer, the method comprising:
   establishing a call path between an antivirus program and an operating system kernel routine, the call path not including an operating system call table provided by a vendor of an operating system;
   requesting the operating system kernel routine to open a file for the antivirus program by way of the call path; and
   scanning the file for computer viruses.

14. The method of claim 13 wherein the call path includes a device driver in communication with an antivirus system call table containing a pointer to the operating system kernel routine.

15. The method of claim 14 wherein the antivirus system call table is separate from the operating system call table that also includes a pointer to the operating system kernel routine.

16. The method of claim 15 wherein the operating system call table has been corrupted by a rootkit.

* * * * *